United States Patent
Shi et al.

(10) Patent No.: US 12,009,952 B2
(45) Date of Patent: Jun. 11, 2024

(54) METHOD AND DEVICE FOR SCRAMBLING DATA

(71) Applicant: GUANGDONG OPPO MOBILE TELECOMMUNICATIONS CORP., LTD., Guangdong (CN)

(72) Inventors: Zhihua Shi, Guangdong (CN); Wenhong Chen, Guangdong (CN); Yun Fang, Guangdong (CN); Zhi Zhang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 496 days.

(21) Appl. No.: 17/245,494

(22) Filed: Apr. 30, 2021

(65) Prior Publication Data
US 2021/0250210 A1    Aug. 12, 2021

Related U.S. Application Data

(63) Continuation of application No. PCT/CN2018/113538, filed on Nov. 1, 2018.

(51) Int. Cl.
*H04L 25/03* (2006.01)
*H04L 5/00* (2006.01)
*H04W 72/23* (2023.01)

(52) U.S. Cl.
CPC ....... *H04L 25/03866* (2013.01); *H04W 72/23* (2023.01)

(58) Field of Classification Search
CPC ............. H04L 25/03866; H04L 5/0053; H04L 5/0064; H04W 72/23
See application file for complete search history.

(56) References Cited

U.S. PATENT DOCUMENTS

| | | |
|---|---|---|
| 8,848,913 B2 | 9/2014 | Gaal |
| 9,497,755 B2 | 11/2016 | Kim |
| 9,622,246 B2 | 4/2017 | Gaal |
| 9,668,254 B2 | 5/2017 | Liu |
| 9,674,871 B2 | 6/2017 | Lee |
| 9,923,684 B2 | 3/2018 | Ng |

(Continued)

FOREIGN PATENT DOCUMENTS

| | | |
|---|---|---|
| CN | 103354533 A | 10/2013 |
| CN | 104704756 A | 6/2015 |

(Continued)

OTHER PUBLICATIONS

Supplementary European Search Report in the European application No. 18938527.1, dated Nov. 26, 2021. 8 pages.

(Continued)

*Primary Examiner* — Harry H Kim
(74) *Attorney, Agent, or Firm* — Perkins Coie LLP (57) ABSTRACT

Provided in embodiments of the present invention are a data scrambling method and device. The data scrambling method includes: a first device determining pieces of scrambling information corresponding to multiple physical channels, wherein different physical channels correspond to different pieces of scrambling information; and the first device performing descrambling of a received physical channel and/or scrambling of a physical channel to be transmitted based on the scrambling information.

20 Claims, 8 Drawing Sheets

A first device determines pieces of scrambling information corresponding to multiple physical channels, and different physical channels correspond to different pieces of scrambling information — 301

The first device descrambles a received physical channel and/or scrambles a to-be-transmitted physical channel based on the scrambling information — 302

(56) References Cited

U.S. PATENT DOCUMENTS

| | | | |
|---|---|---|---|
| 10,264,572 B2 | 4/2019 | Liu | |
| 2009/0136034 A1 | 5/2009 | Gaal | |
| 2014/0016556 A1* | 1/2014 | Shimezawa | H04L 5/0016 370/328 |
| 2014/0092829 A1* | 4/2014 | Han | H04L 5/0035 370/329 |
| 2014/0192734 A1 | 7/2014 | Ng et al. | |
| 2014/0376486 A1 | 12/2014 | Lee et al. | |
| 2015/0016396 A1 | 1/2015 | Gaal et al. | |
| 2015/0230216 A1 | 8/2015 | Liu et al. | |
| 2015/0245324 A1 | 8/2015 | Kim et al. | |
| 2017/0237586 A1 | 8/2017 | Liu et al. | |
| 2019/0037540 A1 | 1/2019 | Seo et al. | |
| 2019/0069284 A1 | 2/2019 | Wang et al. | |
| 2019/0289584 A1 | 9/2019 | Wang et al. | |
| 2021/0105783 A1* | 4/2021 | Wang | H04L 5/0094 |
| 2021/0160880 A1* | 5/2021 | Zhang | H04L 5/0064 |
| 2021/0258113 A1 | 8/2021 | Shi et al. | |

FOREIGN PATENT DOCUMENTS

| | | | |
|---|---|---|---|
| CN | 104919724 A | 9/2015 | |
| CN | 107707342 A | 2/2018 | |
| CN | 108650001 A | 10/2018 | |
| JP | 2016506690 A | 3/2016 | |
| JP | 2020529809 A | 10/2020 | |
| WO | 2014067101 A1 | 5/2014 | |
| WO | 2017160100 A2 | 9/2017 | |
| WO | 2018128439 A1 | 7/2018 | |

OTHER PUBLICATIONS

International Search Report in the international application No. PCT/CN2018/113538, dated Jul. 26, 2019.
3GPP TS 38.211 V15.3.0 (Sep. 2018), 3rd Generation Partnership Project; Technical Specification Group Radio Access Network; NR; Physical channels and modulation (Release 15).
3GPP TS 38.214 V15.3.0 (Sep. 2018), 3rd Generation Partnership Project; Technical Specification Group Radio Access Network; NR; Physical layer procedures for data (Release 15).
3GPP TSG RAN WG1 Meeting #94bis R1-1810302, Chengdu, China, Oct. 8-12, 2018, Agenda item:7.2.8.2, Source:LG Electronics, Title:Enhancements on multi-TRP/panel transmission, Document for:Discussion and Decision.
3GPP TSG RAN WG1 Meeting #94bis R1-1810790, Chengdu, China, Oct. 8-12, 2018, Source:Intel Corporation, Title: Discussion on multi-TRP/multi-panel transmission, Agenda item:7.2.8.2, Document for:Discussion and Decision.
3GPP TSG RAN WG1 Meeting #94bis R1-1810966, Chengdu, China, Oct. 8-12, 2018, Source:OPPO, Title: Enhancements on multi-TRP and multi-panel transmission, Agenda Item:7.2.8.2, Document for Discussion and Decision.
English translation of the Written Opinion of the International Search Authority in the international application No. PCT/CN2018/113538, dated Jul. 26, 2019.
Third Office Action of the European application No. 18938527.1, dated Aug. 2, 2023, 8 pages.
ZTE, "Remaining issues on NR physical downlink control channel", 3GPP TSG RAN WG1 Meeting #94bis R1-1810339, Oct. 8-12, 2018, 11 pages.
First Office Action of the Chinese application No. 202211139934.4, dated Aug. 16, 2023, 9 pages with English translation.
First Office Action of the Chinese application No. 202110601122.6, dated Apr. 2, 2022. 15 pages with English translation.
Office Action of the Indian application No. 202117023557, dated Feb. 24, 2022. 6 pages with English translation.
Second Office Action of the European application No. 18938527.1, dated Jan. 30, 2023. 6 pages.
Huawei, HiSilicon. "Multiple NR-PDCCH for Multiple TRP transmission" 3GPP TSG RAN WG1 NR Ad Hoc Meeting R1-1709924 Qingdao, China, Jun. 27-30, 2017.
Huawei, HiSilicon. "Enabling Multiple NR-PDCCH for Multiple TRP Transmission" 3GPP TSG RAN WG1 Meeting #91 R1-1719816, Reno, USA, Nov. 27-Dec. 1, 2017.
Huawei, HiSilicon. "Scheduling and resource allocation for bandwidth parts" 3GPP TSG RAN WG1 Meeting #90 R1-1712156 Prague, Czech Republic, Aug. 21-25, 2017.
Notice of Allowance of the Chinese application No. 202110601122.6, dated Jul. 4, 2022.
First Office Action of the European application No. 18938527.1, dated Sep. 6, 2022.
First Office Action of the Japanese application No. 2021-523362, dated Aug. 26, 2022.
Fourth Office Action of the European application No. 18938527.1, issued on Jan. 25, 2024. 10 pages.

* cited by examiner

Base station

METHOD AND DEVICE FOR SCRAMBLING DATA

CROSS-REFERENCE TO RELATED APPLICATIONS

This is a continuation application of International Patent Application No. PCT/CN2018/113538, filed on Nov. 1, 2018, the disclosure of which is hereby incorporated by reference in its entirety.

BACKGROUND

There is interference between different Physical Downlink Shared Channels (PDSCHs), and it is necessary to randomize the mutual interference between the PDSCHs. For the randomization method for PDSCH in Rel-15, an initial value of a scrambling sequence depends on the parameter dataScramblingIdentityPDSCH, but there is only one parameter value for one BandWidth Part (BWP). Therefore, if multiple PDSCHs are simultaneously transmitted from different beams or Transmit Receive Points (TRPs) on one BWP, the same scrambling method and the same parameter are used. Thus, it is unable to randomize the mutual interference between the PDSCHs.

SUMMARY

The embodiments of the disclosure relate to the field of mobile communication technology, and more particularly to a method and device for scrambling data, and a communication terminal.

A first aspect of the embodiments of the disclosure provides a method for scrambling data, which includes operations as follows.

A first device determines pieces of scrambling information corresponding to multiple physical channels. Different physical channels correspond to different pieces of scrambling information; and The first device descrambles a received physical channel and/or scrambles a to-be-transmitted physical channel based on the scrambling information.

A second aspect of the embodiments of the disclosure provides a device for scrambling data, applied to the first device. The device includes a processor and a memory configured to store a computer program.

The processor is configured to call and run the computer program stored in the memory to: determine pieces of scrambling information corresponding to multiple physical channels. Different physical channels correspond to different pieces of scrambling information.

The processor is further configured to call and run the computer program stored in the memory to: descramble a received physical channel and/or scramble a to-be-transmitted physical channel based on the scrambling information.

BRIEF DESCRIPTION OF THE DRAWINGS

The accompany drawings constituting a part of the disclosure provide further understanding of the disclosure. The schematic embodiments of the disclosure and description thereof are intended to be illustrative of the disclosure and do not constitute an undue limitation of the disclosure. In the accompanying drawings.

DETAILED DESCRIPTION

The technical solutions in the embodiments of the present disclosure will be described in combination with the drawings in the embodiments of the present disclosure. Apparently, the described embodiments are only part of the embodiments of the present disclosure, rather than all of the embodiments. Based on the embodiments in the present disclosure, all other embodiments obtained by those of ordinary skill in the art without creative work shall fall within the protection scope of present disclosure.

The technical solutions of the embodiments of the disclosure may be applied to various communication systems, for example, a Global System of Mobile Communication (GSM), a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, LTE Time Division Duplex (TDD), a Universal Mobile Telecommunication System (UMTS), a Worldwide Interoperability for Microwave Access (WiMAX) communication system or a 5G system.

Figure 1:
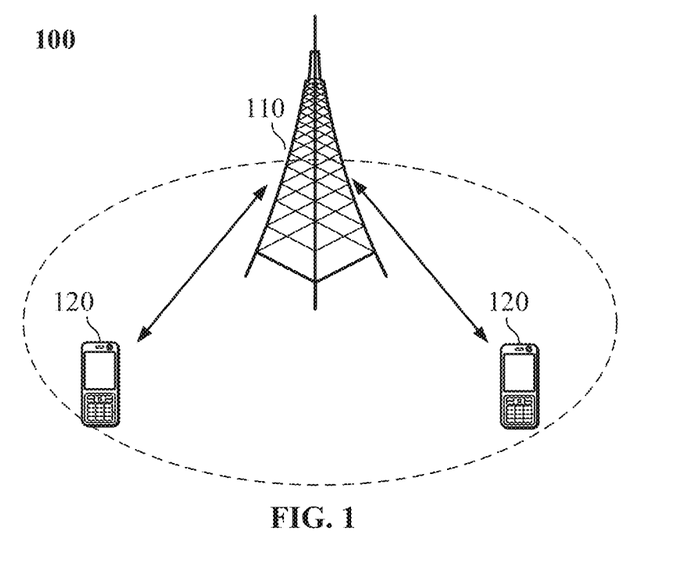
FIG. 1 illustrates a schematic diagram of architecture of a communication system provided by an embodiment of the present disclosure.

For instance, FIG. 1 illustrates a communication system 100 to which the embodiments of the disclosure are applied. The communication system 100 may include a network device 110. The network device 110 may be a device communicating with a terminal device 120 (also called a communication terminal, or a terminal). The network device 110 may provide communication coverage for a specific geographical region and may communicate with a terminal device in the coverage. Optionally, the network device 110 may be a Base Transceiver Station (BTS) in the GSM or the CDMA system, may also be a NodeB (NB) in the WCDMA system, and may further be an Evolutional Node B (eNB or eNodeB) in the LTE system or a wireless controller in a Cloud Radio Access Network (CRAN). Alternatively, the network device may be a mobile switching center, a relay station, an access point, a vehicle-mounted device, a wearable device, a hub, a switch, a bridge, a router, a network-side device in a 5G network, a network device in a future evolved Public Land Mobile Network (PLMN) or the like.

The communication system 100 further includes at least one terminal device 120 within the coverage of the network device 110. A "terminal" as used herein includes, but is not limited to be connected via a wired line, such as via a Public Switched Telephone Network (PSTN), a Digital Subscriber Line (DSL), a digital cable, and a direct cable; and/or, another data connection/network; and/or, a device via a wireless interface, such as for a cellular network, a Wireless Local Area Network (WLAN), a digital television network such as a Digital Video Broadcasting handheld (DVB-H) network, a satellite network, an Amplitude Modulation/Frequency Modulation (AM-FM) broadcast transmitter; and/or, a device of another terminal configured to receive/transmit communication signals; and/or, an Internet of Things (IoT) device. A terminal configured to communicate via a wireless interface may be referred as a "wireless communication terminal", a "wireless terminal" or a "mobile terminal". Examples of the mobile terminal include, but are not limited to, a satellite or cellular phone; a Personal Communications System (PCS) terminal that can combine a cellular radio phone with data processing, fax, and data communication capabilities; a Personal Digital Assistant (PDA) that includes a radio phone, a pager, an Internet/Intranet access, a Web browser, a memo pad, a calendar, and/or a Global Positioning System (GPS) receiver; and a conventional laptop and/or a palmtop receiver or other electronic devices including a radio telephone transceiver. The terminal may be an access terminal, a User Equipment (UE), a user unit, a user station, a mobile station, a mobile radio station, a remote station, a remote terminal, a mobile device, a user terminal, a terminal, a wireless communication device, a user agent or a user device. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, another processing device connected to a wireless modem, a vehicle-mounted device, a wearable device, a terminal device in the 5G network, a terminal device in the future evolved PLMN or the like.

Optionally. Device to Device (D2D) communication may be performed between the terminal devices 120.

Optionally, the 5G system or 5G network may also be called a New Radio (NR) system or network.

One network device and two terminal devices are exemplarily shown in FIG. 1. Optionally, the communication system 100 may include multiple network devices, and another number of terminal devices may be included in coverage of each network device, which is not limited in the embodiments of the disclosure.

Optionally, the wireless communication system 100 may further include another network entity such as a network controller and a mobility management entity, which is not limited in the embodiments of the disclosure.

It is to be understood that the device having the communication function in the network/system in the embodiment of the present disclosure can be referred as a communication terminal. Taking the communication system 100 shown in FIG. 1 as an example, the communication terminal may include a network device 110 and a terminal device 120 both having a communication function. The network device 110 and the terminal device 120 may be devices described above, which is not described repeatedly here anymore. The communication terminal may further include other devices in the communication system 100 such as a network controller and a mobility management entity, which is not limited in the embodiments of the disclosure.

It is to be understood that terms "system" and "network" in the disclosure may usually be exchanged in the disclosure. In the disclosure, term "and/or" only indicates an association relationship for describing associated objects and represents that there are three relationships. For example, A and/or B may represent three conditions: i.e., independent existence of A, existence of both A and B and independent existence of B. In addition, character "/" in the disclosure usually represents that previous and next associated objects form an "or" relationship.

In order to facilitate understanding of the technical solutions of the embodiments of the present disclosure, the related technologies involved in the embodiments of the present disclosure are described.

Figure 2A:
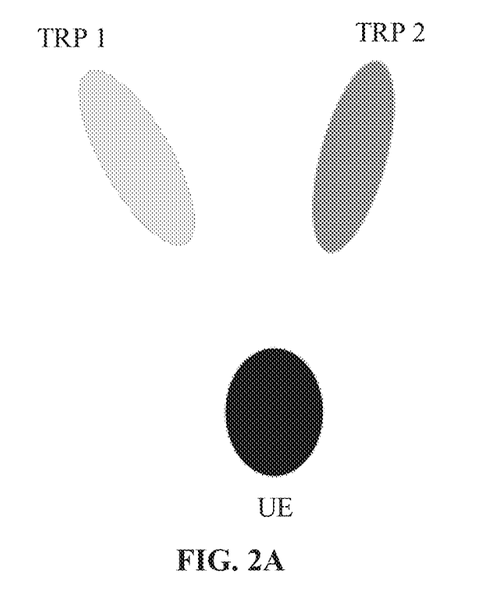
FIG. 2A illustrates a schematic diagram of simultaneous transmission of multiple Transmit Receive Points (TRPs) to a UE.
Figure 2B:
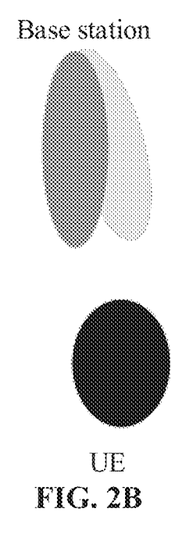
FIG. 2B illustrates a schematic diagram of simultaneous transmission of multiple beams to the UE.

In the 5th generation (5G) New Radio (NR), multiple TRPs (or multiple antenna panels) or multiple beams can simultaneously transmit data to a UE. Referring to FIG. 2A and FIG. 2B, FIG. 2A illustrates a schematic diagram of simultaneous transmission of multiple TRPs to the UE, and FIG. 2B illustrates a schematic diagram of simultaneous transmission of multiple beams to the UE. The solution for the simultaneous transmission of multiple TRPs/beams to the UE may include two alternative solutions.

In a first solution (Alt1), the UE only receives one Physical Downlink Control Channel (PDCCH), and the PDCCH indicates relevant indication information of data transmitted on multiple TRPs/beams.

In a second solution (Alt2), the UE receives different PDCCHs from different TRPs/beams, and each PDCCH indicates corresponding indication information of data transmission.

For the second solution (Alt2), the UE needs to simultaneously detect multiple PDCCHs on a same carrier. Further, the possible application scenario of the second solution (Alt2) includes at least the following scenarios.

In a S1-1 scenario, multiple TRPs belong to a same cell, and the connection (backhaul) between the TRPs is ideal (that is, information interaction i.e. dynamic information interaction, can be carried out quickly).

In a S1-2 scenario, multiple TRPs belong to a same cell, and the connection (backhaul) between the TRPs is not ideal (i.e., TRPs are unable to interact information quickly, and can only interact data slowly).

In a S1-3 scenario, multiple TRPs belong to different cells, and the connection (backhaul) between the TRPs is ideal.

In a S1-4 scenario, multiple TRPs belong to different cells, and the connection (backhaul) between the TRPs is not ideal.

In a S2-1 scenario, multiple beams belong to a same cell, and the connection (backhaul) between the beams is ideal.

In a S2-2 scenario, multiple beams belong to a same cell, and the connection (backhaul) between the beams is not ideal.

In a S2-3 scenario, multiple beams belong to different cells, and the connection (backhaul) between the beams is ideal.

In a S2-4 scenario, multiple beams belong to different cells, and the connection (backhaul) between the beams is not ideal.

For the second solution (Alt2), if multiple TRPs or multiple beams belong to the same cell, interference exists between different PDSCHs, and it is necessary to randomize the mutual interference between the PDSCHs. The method of PDSCH randomization is described as follows.

Assuming that a bit block corresponding to a codeword 9 is represented as $b^{(q)}(0), \ldots, b^{(q)}(M_{bit}^{(q)}-1)$, where $M_{bit}^{(q)}$ represents the number of bits contained in the codeword q, and the bit block may be scrambled according to the formula (1) to acquire a scrambled bit block $\tilde{b}^{(q)}(0), \ldots, \tilde{b}^{(q)}(M_{bit}^{(q)}-1)$:

$$\tilde{b}^{(q)}(i) = (b^{(q)}(i) + c^{(q)}(i)) \bmod 2 \qquad (1)$$

$c^{(q)}(i)$ represents a scrambling sequence, and a scrambling sequence generator is initialized according to the formula (2):

$$c_{init}=n_{RNTI}\cdot 2^{15}+q\cdot 2^{14}+n_{ID} \quad (2)$$

$n_{ID} \in \{0, 1, \ldots, 1023\}$ is equal to a high level parameter dataScramblingIdentityPDSCH. Accordingly, during randomization, an initial value of the scrambling sequence depends on the parameter dataScramblingIdentityPDSCH, and only one parameter value corresponds to one BWP. Therefore, if multiple PDSCHs are simultaneously transmitted from different beams or TRPs on one BWP, the same scrambling method and the same parameter are used. Thus, it is unable to randomize the mutual interference between the PDSCHs. As a result, the requirements of the above-mentioned second solution (Alt2) cannot be met.

According to the technical solution of the embodiments of the present disclosure, a method for scrambling data is provided, which can randomize the mutual interference between multiple physical channels which are transmitted simultaneously.

Figure 3:
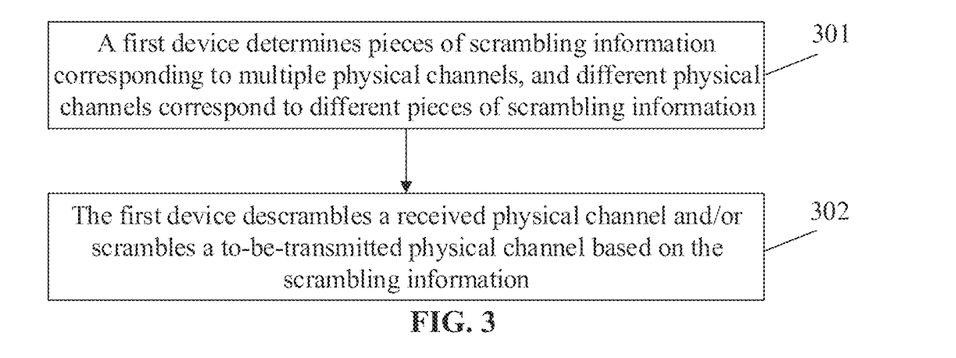
FIG. 3 illustrates a flow diagram of a method for scrambling data provided by an embodiment of the present disclosure.

FIG. 3 illustrates a flow diagram of a method for scrambling data provided by an embodiment of the present disclosure. As shown in FIG. 3, the method for scrambling data includes the following operations.

In operation 301, a first device determines pieces of scrambling information corresponding to multiple physical channels. Different physical channels correspond to different pieces of scrambling information.

In embodiments of the present disclosure, the first device may be a terminal or the first device may be a network device. Herein, the terminal may be any device capable of communicating with a network, such as a mobile phone, a tablet computer, a vehicle-mounted terminal or a notebook. The network device may be a base station, such as a NR base station (gNB), or a LTE base station (eNB).

In embodiments of the present disclosure, the multiple physical channels may be multiple PDSCHs. or multiple Physical Uplink Shared Channels (PUSCHs), or multiple Physical Uplink Control Channels (PUCCHs).

For instance, a terminal transmits multiple PUSCHs, and different PUSCHs correspond to different pieces of scrambling information. The scrambling information is configured to determine an initial value of a scrambling sequence of the PUSCH.

For instance, a terminal transmits multiple PUCCHs, and different PUCCHs correspond to different pieces of scrambling information. The scrambling information is configured to determine an initial value of a scrambling sequence of the PUCCH.

For instance, a terminal receives multiple PDSCHs, and different PDSCHs correspond to different pieces of scrambling information. The scrambling information is configured to determine an initial value of a scrambling sequence of the PDSCH.

In the embodiment of the present disclosure, the multiple physical channels correspond to multiple TRPs/beams.

For example, a terminal is a signal receiving side, and a TRP is a signal transmitting side. PDSCH1 is transmitted between the terminal and TRP1, PDSCH2 is between the terminal and TRP2, and PDSCH3 is transmitted between the terminal and TRP3. PDSCH1 corresponds to scrambling information 1, PDSCH2 corresponds to scrambling information 2, and PDSCH3 corresponds to scrambling information 3.

For another example, the terminal is the signal transmitting side, and a beam of a base station is the signal receiving side. PUSCH1 is transmitted between the terminal and beam1. PUSCH2 is transmitted between the terminal and beam2, and PUSCH3 is transmitted between the terminal and beam3. PUSCH1 corresponds to scrambling information 1, PUSCH2 corresponds to scrambling information 2, and PUSCH3 corresponds to scrambling information 3.

For a further example, the terminal is the signal transmitting side, and a beam of the base station is the signal receiving side. PUCCH1 is transmitted between the terminal and beam1, PUCCH2 is transmitted between the terminal and beam2, and PUCCH3 is transmitted between the terminal and beam3. PUCCH1 corresponds to scrambling information 1. PUCCH2 corresponds to scrambling information 2, and PUCCH3 corresponds to scrambling information 3.

The technical solution of the embodiments of the present disclosure is applicable to the following scenarios: 1) the multiple physical channels belong to a same cell; or 2) the multiple physical channels belong to different cells, respectively; or 3) a part of the multiple physical channels belong different cells, respectively.

In operation 302, based on the scrambling information, the first device descrambles received physical channel, and/or scrambles a to-be-transmitted physical channel.

In embodiments of the present disclosure, the first device determines scrambling the physical channel based on the scrambling information. For example, an initial value of a scrambling sequence of the physical channel may be determined based on the scrambling information. Then, a scrambling sequence generator is configured to generate an actual scrambling sequence, and the physical channel may be scrambled or descrambled by the scrambling sequence.

With the technical solutions of the embodiments of the present disclosure, in a scenario that a terminal transmits or receives multiple physical channels simultaneously, different physical channels correspond to different pieces of scrambling information, to randomize interference between data and thus improve the system performance.

In embodiments of the present disclosure, different physical channels correspond to different pieces of scrambling information. The first device can determine the scrambling information in any one or more of the following manners. In order to facilitate understanding for the technical solutions of the following embodiments, the relevant concepts involved in the following embodiments are explained.

A network may configure a Control Resource Set (CORE-SETs). Each CORESET has its own identifier (ID). i.e. ControlResourceSetId.

On the basis of the CORESETs, the network may configure a search space (SS). Each SS has its own ID, i.e. SearchSpaceId. Further, each SS is associated with one CORESET.

It should be noted that one Search Space can only be associated with one CORESET, and one CORESET can be associated with one or more search spaces.

It should be noted that a search space may also be referred as a search space set, that is the search space and the search space set are a same concept.

The terminal detects downlink (DL) grant and/or uplink (UL) grant in a specified search space.

Each search space corresponds to one search space group, and one search space group may include one or more search spaces.

It should be noted that the search space group and the search space set are different concepts. The search space set is equivalent to the search space, in other words, the search space set may include one or more search space sets.

Each search space set corresponds to one CORESET Group, and one CORESET Group may include one or more CORESETs.

Based on the above concepts, the scrambling information is implemented as following manner.

In a first manner, the scrambling information of the physical channel may include an identifier of a first search space. The first search space is a search space where Downlink Control Information (DCI) for scheduling the physical channel is located.

Herein, the identifier of the first search space is configured to determine an initial value of a scrambling sequence of the physical channel.

For example, a network may configure SSs for a UE, and each SS has a corresponding identifier. If DCI for scheduling a PDSCH/PUSCH/PUCCH belongs to a search space SS X, the identifier corresponding to the SS X may be configured for data scrambling or data descrambling. Further, the identifier corresponding to the SS X may be configured to determine an initial value of a scrambling sequence.

In a second manner, the scrambling information of the physical channel may include an identifier of a first control resource set associated with a first search space. The first search space is a search space where downlink control information (DCI) for scheduling the physical channel is located Herein, the identifier of the first control resource set is configured to determine an initial value of a scrambling sequence of the physical channel.

For example, a network may configure SSs for a UE. Each SS corresponds to one CORESET, and each of CORESETs corresponds to an identifier. If DCI for scheduling a PDSCH/PUSCH/PUCCH belongs to a search space SS X, and the SS X is associated with a CORESET X, the identifier corresponding to the CORESET X may be configured for data scrambling or data descrambling. Further, the identifier corresponding to the CORESET X may be configured to determine an initial value of a scrambling sequence.

In a third manner, the scrambling information of the physical channel may include information related to a search space group corresponding to a first search space. The first search space is a search space where downlink control information (DCI) for scheduling the physical channel is located.

Herein, the information related to the search space group corresponding to the first search space may be configured to determine an initial value of a scrambling sequence of the physical channel. The information related to the search space group corresponding to the first search space may be implemented in the following manners 1) or 2).

In the manner 1), the information related to the search space group corresponding to the first search space may be a group identifier of the search space group corresponding to the first search space.

In the manner 2), the information related to the search space group corresponding to the first search space is a scrambling parameter which corresponds to the search space group corresponding to the first search space. The scrambling parameter is configured by a network.

For example, a network may configure SSs for a UE, and different SSs correspond to different groups. If DCI for scheduling a PDSCH/PUSCH/PUCCH belongs to a search space SS X, and the group corresponding to the SS X is a group A, the information corresponding to the group A may be configured for data scrambling or data descrambling. Here, the information corresponding to the group A may be a group identifier of the group A, or a scrambling parameter (the parameter is configured by the network) corresponding to the group A. Further, the information corresponding to the group A may be configured to determine an initial value of a scrambling sequence.

In a fourth manner, the scrambling information of the physical channel may include information related to a control resource set group corresponding to a first control resource set associated with a first search space. The first search space is a search space where downlink control information (DCI) for scheduling the physical channel is located.

Herein, the information related to a control resource set group corresponding to a first control resource set may be configured to determine an initial value of a scrambling sequence of the physical channel. The information related to a control resource set group corresponding to a first control resource set may be implemented in the following manners 1) or 2).

In the manner 1), the information related to a control resource set group corresponding to a first control resource set may be a group identifier of the control resource set group corresponding to the first control resource set.

In the manner 2), the information related to a control resource set group corresponding to a first control resource set may be a scrambling parameter which corresponds to the control resource set group corresponding to the first control resource set. The scrambling parameter is configured by a network.

For example, a network may configure SSs for a UE. Each SS corresponds to one CORESET, and different CORESETs correspond to different groups. If DCI for scheduling a PDSCH/PUSCH/PUCCH belongs to a search space SS X, the SS X corresponds to a CORESE X, and the CORESE X belongs to a group A, the information corresponding to the group A may be configured for data scrambling or data descrambling. Here, the information corresponding to the group A may be a group identifier corresponding to the group A, or a scrambling parameter (the parameter is configured by the network) corresponding to the group A. Further, the information corresponding to the group A may be configured to determine an initial value of a scrambling sequence.

In a fifth manner, the scrambling information of the physical channel may include first configuration information carried in a configuration of a first search space. The first search space is a search space where downlink control information (DCI) for scheduling the physical channel is located.

Herein, the first configuration information is configured to determine an initial value of a scrambling sequence of the physical channel.

For example, a network may configure SSs for a UE, and each SS configuration carries additional configuration information Z1. If DCI for scheduling a PDSCH/PUSCH/PUCCH belongs to a search space SS X, the configuration information Z1 corresponding to the SS X may be configured for data scrambling or data descrambling. Further, the configuration information Z1 may be configured to determine an initial value of a scrambling sequence.

In a sixth manner, the scrambling information of the physical channel may include second configuration information carried in a configuration of a first control resource set associated with a first search space. The first search space is a search space where downlink control information (DC) for scheduling the physical channel is located.

Herein, the second configuration information may be configured to determine an initial value of a scrambling sequence of the physical channel.

For example, a network may configure SSs for a UE. Each SS corresponds to one CORESET, and the configuration of each CORESET carries additional configuration information Z2. If DCI for scheduling a PDSCH/PUSCH/PUCCH belongs to a search space SS X, and the SS X is associated with a CORESET X, the configuration information Z2 corresponding to the CORESET X may be configured for data scrambling or data descrambling. Further, the configuration information Z2 may be configured to determine an initial value of a scrambling sequence.

In a seventh manner, the scrambling information of the physical channel may be determined based on at least one of third configuration information or a first association relationship.

Herein, the network may configure multiple pieces of scrambling information for data transmission of one BWP. Specifically, the network may configure the multiple pieces of scrambling information through Radio Resource Control (RRC), or, through Media Access Control Control Element (MAC CE).

In a manner 1), the third configuration information may be configured by a network through radio resource control (RRC), and the third configuration information may include multiple scrambling parameters.

After the network configures the multiple scrambling parameters through RRC, the network associates a scrambling parameter with a physical channel, and/or a search space, and/or a control resource set, and/or a search space group, and/or a control resource set group through a first association relationship.

The first association relationship may be configured by the network through RRC signaling, and the first association relationship may include at least one of: an association relationship between a scrambling parameter and a physical channel; an association relationship between a scrambling parameter and a search space; an association relationship between a scrambling parameter and a search space group; or an association relationship between a scrambling parameter and a control resource set group.

Alternatively, the first association relationship may be configured by the network through media access control control element (MAC CE) signaling, and the first association relationship may include at least one of: an association relationship between a scrambling parameter and a physical channel; an association relationship between a scrambling parameter and a search space; an association relationship between a scrambling parameter and a control resource set; an association relationship between a scrambling parameter and a search space group; or an association relationship between a scrambling parameter and the control resource set group.

Alternatively, the first association relationship may be indicated by the network through downlink control information (DCI), and the first association relationship may include an association relationship between a scrambling parameter and the physical channel.

Further, a first information domain carried in the DCI is used to indicate a scrambling parameter associated with the physical channel.

Alternatively, scrambling information used in transmission of the DCI is used to determine (indicate or carry) the scrambling parameter associated with the physical channel.

Alternatively, a radio network temporary identity (RNTI) used in transmission the DCI is used to determine a scrambling parameter associated with the physical channel.

For example, the network may configure three scrambling parameters which include a scrambling parameter 1, a scrambling parameter 2 and a scrambling parameter 3 through RRC. The network may indicate that a physical channel 1 corresponds to the scrambling parameter 1 through RRC signaling or MAC CE signaling or DCI signaling. It should be noted that it is not limited to indicate one association relationship by the network, and the network may indicate multiple association relationships. For example, the physical channel 1 corresponds to the scrambling parameter 1, the physical channel 2 corresponds to the scrambling parameter 2, and the physical channel 3 corresponds to the scrambling parameter 3.

In a manner 2), the third configuration information may be configured by the network through a MAC CE, and the third configuration information may include multiple scrambling parameters.

Herein, the network may directly configure the scrambling parameters for a search space and/or a control resource set and/or a search space group and/or a control resource set group through MAC CE signaling. In this case, it is possible to determine which scrambling parameter corresponds to which search space and/or control resource set and/or search space group and/or control resource set group without using the first association relationship.

If the network only configures the multiple scrambling parameters through the MAC CE signaling, the network associates a scrambling parameter with a physical channel, and/or a search space, and/or a control resource set, and/or a search space group, and/or a control resource set group through a first association relationship.

The first association relationship may be configured by the network through MAC CE signaling, and the first association relationship may include at least one of: an association relationship between a scrambling parameter and a search space; an association relationship between a scrambling parameter and a control resource set; an association relationship between a scrambling parameter and a search space group; or an association relationship between a scrambling parameter and a control resource set group.

Alternatively, the first association relationship may be indicated by the network through downlink control information (DCI), and the first association relationship may include an association relationship between a scrambling parameter and the physical channel.

Further, a first information domain carried in the DCI may be used to indicate a scrambling parameter associated with the physical channel.

Alternatively, scrambling information used in transmission of the DC1 may be used to determine (indicate or carry) the scrambling parameter associated with the physical channel.

Alternatively, a radio network temporary identity (RNTI) used in transmission the DCI may be used to determine a scrambling parameter associated with the physical channel.

For example, through MAC CE, the network may configure that a physical channel 1 corresponds to a scrambling parameter 1, a physical channel 2 corresponds to the scrambling parameter 2, and a physical channel 3 corresponds to a scrambling parameter 3.

For example, the network may configure three scrambling parameters including a scrambling parameter 1, a scrambling parameter 2 and a scrambling parameter 3 through an MAC CE. The network may indicate that a physical channel 1 corresponds to the scrambling parameter 1 through MAC CE signaling or DCI signaling.

It should be noted that the above solution may be implemented separately or in combination.

Figure 4:
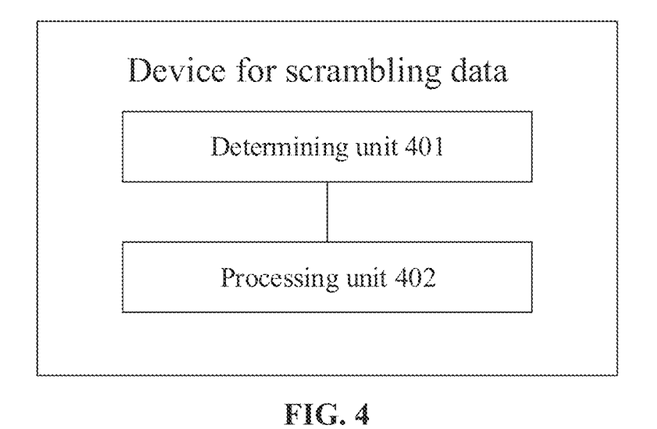
FIG. 4 illustrates a schematic structural composition diagram of a device for scrambling data provided by an embodiment of the present disclosure.

FIG. 4 illustrates a schematic structural composition diagram of a device for scrambling data according to an embodiment of the present disclosure, which is applied to the first device. Referring to FIG. 4, the device may include a determining unit 401 and a processing unit 402.

The determining unit 401 is configured to determine pieces of scrambling information corresponding to multiple physical channels. Different physical channels correspond to different pieces of scrambling information.

The processing unit 402 is configured to, based on the scrambling information, descramble a received physical channel and/or scramble a to-be-transmitted physical channel.

In an embodiment, the scrambling information of the physical channel may include an identifier of a first search space, and the first search space may be a search space where downlink control information (DCI) for scheduling the physical channel is located.

In an embodiment, the identifier of the first search space may be configured to determine an initial value of a scrambling sequence of the physical channel.

In an embodiment, the scrambling information of the physical channel may include an identifier of a first control resource set associated with a first search space, and the first search space may be a search space where downlink control information (DCI) for scheduling the physical channel is located.

In an embodiment, the identifier of the first control resource set may be configured to determine an initial value of a scrambling sequence of the physical channel.

In an embodiment, the scrambling information of the physical channel may include information related to a search space group corresponding to a first search space, and the first search space may be a search space where downlink control information (DCI) for scheduling the physical channel is located.

In an embodiment, the information related to the search space group corresponding to the first search space may be a group identifier of the search space group corresponding to the first search space.

In an embodiment, the information related to the search space group corresponding to the first search space may be a scrambling parameter which corresponds to the search space group corresponding to the first search space, and the scrambling parameter may be configured by a network.

In an embodiment, the information related to the search space group corresponding to the first search space is configured to determine an initial value of a scrambling sequence of the physical channel.

In an embodiment, the scrambling information of the physical channel may include information related to a control resource set group corresponding to a first control resource set associated with a first search space, and the first search space may be a search space where downlink control information (DCI) for scheduling the physical channel is located.

In an embodiment, the information related to the control resource set group corresponding to the first control resource set may be a group identifier of the control resource set group corresponding to the first control resource set.

In an embodiment, the information related to the control resource set group corresponding to the first control resource set may be a scrambling parameter which corresponds to the control resource set group corresponding to the first control resource set, and the scrambling parameter may be configured by a network.

In an embodiment, the information related to the control resource set group corresponding to the first control resource set may be configured to determine an initial value of a scrambling sequence of the physical channel.

In an embodiment, the scrambling information of the physical channel may include first configuration information carried in a configuration of a first search space, and the first search space may be a search space where downlink control information (DCI) for scheduling the physical channel is located.

In an embodiment, the first configuration information may be configured to determine an initial value of a scrambling sequence of the physical channel.

In an embodiment, the scrambling information of the physical channel may include second configuration information carried in a configuration of a first control resource set associated with a first search space, and the first search space may be a search space where downlink control information (DO) for scheduling the physical channel is located.

In an embodiment, the second configuration information may be configured to determine an initial value of a scrambling sequence of the physical channel.

In an embodiment, the scrambling information of the physical channel may be determined based on at least one of third configuration information or a first association relationship.

In an embodiment, the third configuration information may be configured by a network through radio resource control (RRC), and the third configuration information may include multiple scrambling parameters.

In an embodiment, the first association relationship may be configured by the network through RRC signaling, and the first association relationship may include at least one of: an association relationship between a scrambling parameter and a physical channel; an association relationship between a scrambling parameter and a search space; an association relationship between a scrambling parameter and a search space group; or an association relationship between a scrambling parameters and a control resource set group.

In an embodiment, the first association relationship may be configured by the network through media access control control element (MAC CE) signaling, and the first association relationship may include at least one of: an association relationship between a scrambling parameter and a physical channel; an association relationship between a scrambling parameter and a search space; an association relationship between a scrambling parameter and a control resource set; an association relationship between a scrambling parameter and a search space group; or an association relationship between a scrambling parameter and the control resource set group.

In an embodiment, the first association relationship may be indicated by the network through downlink control information (DCI), and the first association relationship may include an association relationship between a scrambling parameter and the physical channel.

In an embodiment, a first information domain carried in the DCI is used to indicate a scrambling parameter associated with the physical channel.

Alternatively, scrambling information used in transmission of the DCI is used to determine the scrambling parameter associated with the physical channel.

Alternatively, a radio network temporary identity (RNTI) used in transmission the DCI is used to determine a scrambling parameter associated with the physical channel.

In an embodiment, the third configuration information may be configured by the network through an MAC CE, and the third configuration information may include multiple scrambling parameters.

In an embodiment, the first association relationship may be configured by the network through MAC CE signaling, and the first association relationship may include at least one of an association relationship between a scrambling parameter and a search space; an association relationship between a scrambling parameter and a control resource set; an association relationship between a scrambling parameter and a search space group; or an association relationship between a scrambling parameter and a control resource set group.

In an embodiment, the first association relationship may be indicated by the network through downlink control information (DCI), and the first association relationship may include an association relationship between a scrambling parameter and a physical channel.

In an embodiment, a first information domain carried in the DCI is used to indicate a scrambling parameter associated with the physical channel.

Alternatively, scrambling information used in transmission of the DCI is used to determine the scrambling parameter associated with the physical channel.

Alternatively, a radio network temporary identity (RNTI) used in transmission the DCI is used to determine a scrambling parameter associated with the physical channel.

In an embodiment, the multiple physical channels may be multiple physical downlink shared channels.

Alternatively, the multiple physical channels may be multiple physical uplink shared channels.

Alternatively, the multiple physical channels may be multiple physical uplink control channels.

In an embodiment, the first device is a terminal, or the first device is a network device.

In an embodiment, the multiple physical channels may belong to a same cell, or the multiple physical channels may belong to different cells, respectively, or a part of the multiple physical channels may belong the different cells, respectively.

Those skilled in the art should understand that the relevant description of the foregoing device for scrambling data in the embodiment of the present disclosure can be understood with reference to the relevant description of the method for scrambling data in the embodiment of the present disclosure.

Figure 5:
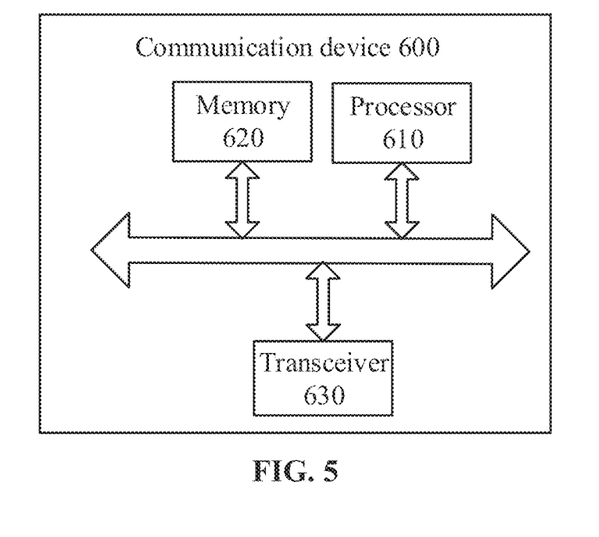
FIG. 5 illustrates a schematic structural diagram of a communication terminal provided by an embodiment of the present disclosure.

FIG. 5 illustrates a schematic structural diagram of a communication terminal 600 according to an embodiment of the present disclosure. The communication terminal 600 may be a terminal, or a network device (such as a base station). As shown in FIG. 5, the communication terminal 600 includes a processor 610, the processor 610 may call and run a computer program from a memory to implement the method in the embodiment of the present disclosure.

Optionally, as shown in FIG. 5, the communication terminal 600 may further include a memory 620. Herein, the processor 610 may call and run a computer program from the memory 620 to implement the method in the embodiment of the present disclosure.

Herein, the memory 620 may be a separate device independent of the processor 610 or may be integrated in the processor 610.

Optionally, as shown in FIG. 5, the communication terminal 600 may further include a transceiver 630, and the processor 610 may control the transceiver 630 to communicate with other devices. Specifically, the transceiver 630 may transmit information or data to other devices, or receive information or data from other devices.

Herein, the transceiver 630 may include a transmitter and a receiver. The transceiver 630 may further include one or more antennas.

Optionally, the communication terminal 600 may be the network device of an embodiment of the present disclosure. The communication terminal 600 may implement the corresponding process implemented by the network device in each method of the embodiment of the present disclosure. For brevity, details will not be repeated herein again.

Optionally, the communication terminal 600 may be the mobile terminal/terminal of an embodiment of the present disclosure. The communication terminal 600 may implement the corresponding process implemented by the mobile terminal/terminal in each method of the embodiment of the present disclosure. For brevity, details will not be repeated herein again.

Figure 6:
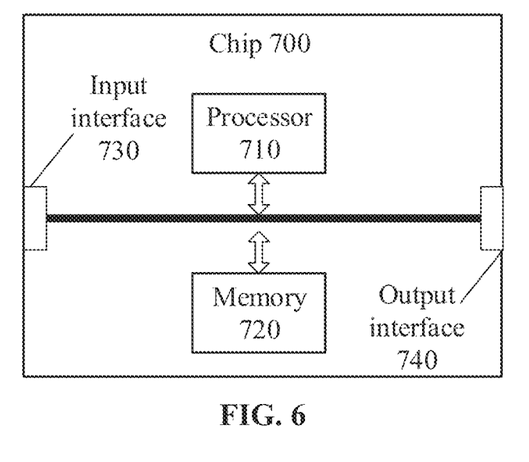
FIG. 6 illustrates a schematic structural diagram of a chip provided by an embodiment of the present disclosure.

FIG. 6 illustrates a schematic structural diagram of a chip provided by an embodiment of the present disclosure. The chip 700 illustrated in FIG. 6 includes a processor 710, and the processor 710 may call and run a computer program from a memory to implement the method in the embodiment of the present disclosure.

Optionally, as shown in FIG. 6, the chip 700 may further include a memory 720. Herein, the processor 710 may call and run a computer program from the memory 720 to implement the method in the embodiment of the present disclosure.

Herein, the memory 720 may be a separate device independent of the processor 710 or may be integrated in the processor 710.

Optionally, the chip 700 may further include an input interface 730. Herein, the processor 710 may control the input interface 730 to communicate with other devices or chips. Specifically, the input interface 730 may acquire information or data from other devices and chips.

Optionally, the chip 700 may further include an output interface 740. Herein, the processor 710 may control the output interface 740 to communicate with other devices or chips. Specifically, the output interface 740 may output information or data to other devices and chips.

Optionally, the chip may be applied to the network device in the embodiment of the disclosure, and the chip may implement the corresponding process implemented by the network device in each method of the embodiment of the present disclosure. For brevity, details will not be repeated herein again.

Optionally, the chip may be applied to the mobile terminal/terminal in the embodiment of the disclosure, and the chip may implement the corresponding process implemented by the mobile terminal/terminal in each method of the embodiment of the present disclosure. For brevity, details will not be repeated herein again.

It should be understood that the chip mentioned in the embodiment of the present disclosure may also be referred as a system-level chip, a system chip, a chip system, or a system-on chip, etc.

Figure 7:
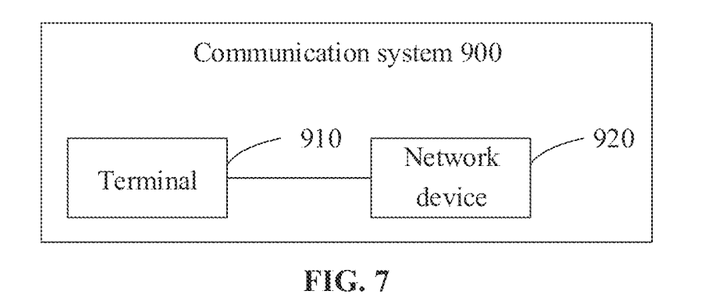
FIG. 7 illustrates a schematic block diagram of a communication system provided by an embodiment of the present disclosure.

FIG. 7 illustrates a schematic block diagram of a communication system 900 provided by an embodiment of the present disclosure. As shown in FIG. 7, the communication system 900 includes a terminal 910 and a network device 920.

Herein, the terminal 910 may be configured to implement the functions implemented by the terminal in the foregoing method, and the network device 920 may be configured to implement the functions implemented by the network device in the foregoing method. For brevity, details are not described herein again.

It is to be understood that the processor in the embodiment of the application may be an integrated circuit chip and has a signal processing capability. In an implementation process, each step of the method embodiment may be completed by an integrated logical circuit of hardware or an instruction in a software form in the processor. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, step and logical block diagram disclosed in the embodiments of the disclosure may be implemented or executed. The universal processor may be a microprocessor or the processor may also be any common processor and the like. The operations of the method disclosed in combination with the embodiments of the disclosure may be directly embodied to be executed and implemented by a hardware decoding processor or executed and implemented by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information in the memory, and implements the steps of the methods in combination with hardware.

It can be understood that the memory in the embodiment of the disclosure may be a volatile memory or a nonvolatile memory, or may include both the volatile and nonvolatile memories. The nonvolatile memory may be a ROM, a PROM, an Erasable PROM (EPROM), an EEPROM or a flash memory. The volatile memory may be a RAM, which is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM). It is to be noted that the memory of a system and method described in the disclosure is intended to include, but not limited to, memories of these and any other proper types.

It can be understood that the above memory is described only exemplarily rather than limitedly. For example, the memory in the embodiment of the present disclosure may be a SRAM, a DRAM, a SDRAM, a DDR SDRAM, an ESDRAM, a SLDRAM, a DR RAM and the like. That is, the memory in the embodiment of the present disclosure is intended to include, but not limited to, memories of these and any other proper types.

The embodiment of the present disclosure further provides a computer-readable storage medium for storing computer programs.

Optionally, the computer-readable storage medium may be applied to the network device in the embodiment of the disclosure, and the computer programs are executed to cause the computer to perform processes implemented by the network device in each method of the embodiment of the present disclosure. For brevity, details will not be repeated herein again.

Optionally, the computer-readable storage medium may be applied to the mobile terminal/terminal in the embodiment of the disclosure, and the computer programs cause the computer to perform the processes implemented by the mobile terminal/terminal in each method of the embodiment of the present disclosure. For brevity, details will not be repeated herein again.

The embodiment of the present disclosure further provides a computer program product, including computer program instructions.

Optionally, the computer program product may be applied to the network device in the embodiment of the disclosure, and the computer program instructions are executed to cause the computer to perform the processes implemented by the network device in each method of the embodiment of the present disclosure. For brevity, details will not be repeated herein again.

Optionally, the computer program product may be applied to the mobile terminal/terminal in the embodiment of the disclosure, and the computer program instructions are executed to cause the computer to perform the processes implemented by the mobile terminal/terminal in each method of the embodiment of the present disclosure. For brevity, details will not be repeated herein again.

The embodiment of the present disclosure also provides a computer program.

Optionally, the computer program may be applied to the network device in the embodiment of the disclosure, and the computer program is run on a computer, to cause the computer to perform the processes implemented by the network device in each method of the embodiment of the present disclosure. For brevity, details will not be repeated herein again.

Optionally, the computer program may be applied to the mobile terminal/terminal in the embodiment of the disclosure, and the computer program is run on a computer, to cause the computer to perform the processes implemented by the mobile terminal/terminal in each method of the embodiment of the present disclosure. For brevity, details will not be repeated herein again.

Those of ordinary skill in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the application.

Those skilled in the art may clearly learn about that for the specific working process of the system device and unit described above, reference may be made to the corresponding processes in the method embodiment, and the specific working process of the system, device and unit will not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, that is, may be located in the same place, or may also be distributed to multiple network units. A part or all of the units may be selected to achieve the purpose of the solutions of the embodiments according to a practical requirement.

In addition, functional units in each embodiment of the application may be integrated into a processing unit, each functional unit may also physically exist independently, and two or more than two functional units may also be integrated into a unit.

If the above functions are implemented in the form of a software function module and sold or used as an independent product, the functions may also be stored in a computer-readable storage medium. Based on such understanding, the essential part of the technical solutions of the embodiments of the present disclosure or a part of the technical solutions that contributes to related technologies or a part of the technical solutions can be implemented in the form of a software product. The computer software product is stored in a storage medium and includes several instructions to enable the computer device (which may be a personal computer, a server or a network device, etc.) to execute all or a part of the methods described in the various embodiments of the present disclosure. The forgoing storage media includes various mediums that can store program codes, such as a USB disk, a mobile hard disk, an ROM, an RAM, a magnetic disk, or an optical disk, and the like.

The foregoing is only the embodiments of the present disclosure, but the protection scope of the present disclosure is not limited thereto. Variation and substitution which can be readily thought by those skilled in the art within the technical scope disclosed in the present disclosure should fall within the protection scope of the present disclosure. Therefore, the protection scope of this disclosure should be subject to the protection scope of the claims.

The invention claimed is:

1. A method for scrambling data, comprising:
receiving, by a terminal device, third configuration information configured by radio resource control (RRC) from a network device,
wherein the third configuration information comprises a plurality of scrambling parameters corresponding to control resource set groups;
receiving, by the terminal device, a plurality of downlink control information (DCIs) for scheduling a plurality of physical downlink shared channels (PDSCHs),
wherein the plurality of DCIs are located in different search spaces, and each of the search spaces comprises information related to the control resource set groups, and the control resource set groups correspond to scrambling information of the plurality of PDSCHs;
determining, by the terminal device, multiple pieces of the scrambling information corresponding to different PDSCHs according to the multiple different search spaces of the received plurality of DCIs; and
performing, by the terminal device, descrambling a received PDSCH based on the scrambling parameter determined based on the scrambling information among the plurality of scrambling parameters.

2. The method of claim 1, wherein the scrambling information of the physical downlink shared channel comprises information related to a control resource set group corresponding to a first control resource set associated with a first search space, and the first search space is a search space where downlink control information (DCI) for scheduling a first physical downlink shared channel is located.

3. The method of claim 2, wherein the information related to the control resource set group corresponding to the first control resource set is a scrambling parameter which corresponds to the control resource set group corresponding to the first control resource set, and the scrambling parameter is configured by a network.

4. The method of claim 2, wherein the information related to the control resource set group corresponding to the first control resource set is configured to determine an initial value of a scrambling sequence of the physical downlink shared channel.

5. The method of claim 1, wherein
the plurality of physical downlink shared channels belong to a same cell; or
the plurality of physical downlink shared channels belong to different cells, respectively; or
a part of the plurality of physical downlink shared channels belongs different cells, respectively.

6. A device for scrambling data, applied to the first device, the device comprising:
a processor, and
a memory configured to store a computer program,
wherein the processor is configured to call and run the computer program stored in the memory to:
receive, by a terminal device, third configuration information configured by radio resource control (RRC) from a network device,
wherein the third configuration information comprises a plurality of scrambling parameters corresponding to control resource set groups;
receive, by the terminal device, a plurality of downlink control information (DCIs) for scheduling a plurality of physical downlink shared channels (PDSCHs),
wherein the plurality of DCIs are located in different search spaces, and each of the search spaces comprises information related to the control resource set groups, and the control resource set groups correspond to scrambling information of the plurality of PDSCHs;
determine, by the terminal device, multiple pieces of the scrambling information corresponding to different PDSCHs according to the multiple different search spaces of the received plurality of DCIs; and
perform, by the terminal device, descrambling a received PDSCH based on the scrambling parameter determined based on the scrambling information among the plurality of scrambling parameters.

7. The device of claim 6, wherein the scrambling information of the physical downlink shared channel comprises information related to a control resource set group corresponding to a first control resource set associated with a first search space, and the first search space is a search space where downlink control information (DCI) for scheduling a first physical downlink shared channel is located.

8. The device of claim 7, wherein the information related to the control resource set group corresponding to the first control resource set is a scrambling parameter which corresponds to the control resource set group corresponding to the first control resource set, the scrambling parameter is configured by a network.

9. The device of claim 7, wherein the information related to the control resource set group corresponding to the first control resource set is configured to determine an initial value of a scrambling sequence of the physical downlink shared channel.

10. The device of claim 6, wherein
the plurality of physical downlink shared channels belong to a same cell; or
the plurality of physical downlink shared channels belongs to different cells, respectively; or
a part of the plurality of physical downlink shared channels belongs different cells, respectively.

11. A method for scrambling data, comprising:
transmitting, by a network device, third configuration information configured by radio resource control (RRC) to a terminal device,
wherein the third configuration information comprises a plurality of scrambling parameters corresponding to control resource set groups;
transmitting, by the network device, a plurality of downlink control information (DCIs) for scheduling a plurality of physical downlink shared channels (PDSCHs),
wherein the plurality of DCIs are located in different search spaces, and each of the search spaces comprises information related to the control resource set groups, and the control resource set groups correspond to scrambling information of the plurality of PDSCHs;
wherein multiple pieces of the scrambling information corresponding to different PDSCHs are determined according to the multiple different search spaces of the received plurality of DCIs; and a received PDSCH is descrambled based on the scrambling parameter determined based on the scrambling information among the plurality of scrambling parameters.

12. The method of claim 11, wherein the scrambling information of the physical downlink shared channel comprises information related to a control resource set group corresponding to a first control resource set associated with a first search space, and the first search space is a search space where downlink control information (DCI) for scheduling a first physical downlink shared channel is located.

13. The method of claim 12, wherein the information related to the control resource set group corresponding to the first control resource set is a scrambling parameter which corresponds to the control resource set group corresponding to the first control resource set, and the scrambling parameter is configured by a network.

14. The method of claim 12, wherein the information related to the control resource set group corresponding to the first control resource set is configured to determine an initial value of a scrambling sequence of the physical downlink shared channel.

15. The method of claim 11, wherein
the plurality of physical downlink shared channels belong to a same cell; or
the plurality of physical downlink shared channels belong to different cells, respectively; or
a part of the plurality of physical downlink shared channels belongs different cells, respectively.

16. A device for scrambling data, applied to the first device, the device comprising:
a processor, and
a memory configured to store a computer program,
wherein the processor is configured to call and run the computer program stored in the memory to:
transmit, by a network device, third configuration information configured by radio resource control (RRC) to a terminal device,
wherein the third configuration information comprises a plurality of scrambling parameters corresponding to control resource set groups;
transmit, by the network device, a plurality of downlink control information (DCIs) for scheduling a plurality of physical downlink shared channels (PDSCHs),
wherein the plurality of DCIs are located in different search spaces, and each of the search spaces comprises information related to the control resource set groups, and the control resource set groups correspond to scrambling information of the plurality of PDSCHs;
wherein multiple pieces of the scrambling information corresponding to different PDSCHs are determined according to the multiple different search spaces of the received plurality of DCIs; and a received PDSCH is descrambled based on the scrambling parameter determined based on the scrambling information among the plurality of scrambling parameters.

17. The device of claim 16, wherein the scrambling information of the physical downlink shared channel comprises information related to a control resource set group corresponding to a first control resource set associated with a first search space, and the first search space is a search space where downlink control information (DCI) for scheduling a first physical downlink shared channel is located.

18. The device of claim 17, wherein the information related to the control resource set group corresponding to the first control resource set is a scrambling parameter which corresponds to the control resource set group corresponding to the first control resource set, the scrambling parameter is configured by a network.

19. The device of claim 17, wherein the information related to the control resource set group corresponding to the first control resource set is configured to determine an initial value of a scrambling sequence of the physical downlink shared channel.

20. The device of claim 16, wherein
the plurality of physical downlink shared channels belong to a same cell; or
the plurality of physical downlink shared channels belongs to different cells, respectively; or
a part of the plurality of physical downlink shared channels belongs different cells, respectively.

* * * * *